(12) United States Patent
Li et al.

(10) Patent No.: US 12,330,953 B2
(45) Date of Patent: Jun. 17, 2025

(54) SYNTHESIS METHOD FOR DIRECTLY PREPARING H-TYPE MOLECULAR SIEVE HAVING CHA FRAMEWORK TYPE AND USE THEREOF

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Kaixiang Li, Tianjin (CN); Zhenguo Li, Tianjin (CN); Xiaoning Ren, Tianjin (CN); Congjie Lv, Tianjin (CN); Jianhai Wang, Tianjin (CN); Lingfeng Jia, Tianjin (CN); Yuankai Shao, Tianjin (CN); Cheng Lv, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(*) Notice: Subject to any disclaimer, the term of this patent is extended or adjusted under 35 U.S.C. 154(b) by 282 days.

(21) Appl. No.: 18/337,461

(22) Filed: Jun. 20, 2023

(65) Prior Publication Data

US 2023/0339767 A1 Oct. 26, 2023

Related U.S. Application Data

(63) Continuation of application No. PCT/CN2022/113796, filed on Aug. 21, 2022.

(30) Foreign Application Priority Data

Aug. 26, 2021 (CN) .......................... 202110985026.6

(51) Int. Cl.
*B01J 29/85* (2006.01)
*C01B 39/48* (2006.01)

(52) U.S. Cl.
CPC .......... *C01B 39/48* (2013.01); *C01P 2002/72* (2013.01)

(58) Field of Classification Search
None
See application file for complete search history.

(56) References Cited

U.S. PATENT DOCUMENTS

| 4,544,538 A | 10/1985 | Zones |
| 4,638,076 A * | 1/1987 | Bhattacharya .......... C07C 68/01 |
| | | 558/277 |
| 10,357,760 B2 | 7/2019 | Tanaka et al. |

FOREIGN PATENT DOCUMENTS

| CN | 104475152 A | 4/2015 |
| CN | 113429438 A | 9/2021 |

OTHER PUBLICATIONS

Internation Search Report of PCT/CN2022/113796, Mailed Nov. 29, 2022.

* cited by examiner

*Primary Examiner* — Sheng H Davis
(74) *Attorney, Agent, or Firm* — True Shepherd LLC; Andrew C. Cheng (57) ABSTRACT

An H-type molecular sieve having the CHA framework type is directly prepared through hydrothermal synthesis by using the compounds with the chemical formulas $(C_4H_8NO)_3PO$ and/or $(C_4H_8NO)_2PO(C_4H_{10}N)$ as structure-directing agents. The structure-directing agent has a molecular topological structure, which is conducive to quickly and efficiently building a molecular sieve having the CHA framework type, so that the prepared product has a regular morphology and high relative crystallinity. The synthesis method can directly synthesize the H-type molecular sieve having the CHA framework type with a relative crystallinity greater than 95%. The molecular sieve product can be obtained by direct drying and calcination without an ammonium exchange process, so the synthesis method is simple, easy to perform, and suitable for large-scale production. The samarium-based CHA molecular sieve catalyst shows excellent ammonia adsorption capacity, low-temperature activity, active temperature window, $N_2$ selectivity, and structural stability in the $NH_3$-SCR technology.

3 Claims, 12 Drawing Sheets

SYNTHESIS METHOD FOR DIRECTLY PREPARING H-TYPE MOLECULAR SIEVE HAVING CHA FRAMEWORK TYPE AND USE THEREOF

CROSS-REFERENCE TO RELATED APPLICATIONS

This application is a continuation of International Patent Application No. PCT/CN2022/113796 with a filing date of Aug. 21, 2022, designating the United States, now pending, and further claims priority to Chinese Patent Application No. 202110985026.6 with a filing date of Aug. 26, 2021. The content of the aforementioned applications, including any intervening amendments thereto, are incorporated herein by reference.

TECHNICAL FIELD

The present disclosure belongs to the technical field of molecular sieve synthesis, in particular to a synthesis method for directly preparing an H-type molecular sieve having CHA framework type and use thereof.

DESCRIPTION OF RELATED ART

According to statistics from the Ministry of Public Security, as of March 2021, the motor vehicle population in China reached 378 million, including 287 million automobiles. The rapidly developing automobile industry has promoted significant development of China's transportation industry and brought great convenience to people's production and life. However, the accompanying automobile exhaust pollution is becoming increasingly severe. According to the China Mobile Source Environmental Management Annual Report on Mobile Source Pollution (2020), the total emissions of four pollutants from motor vehicles in China reached 16.038 million tons in 2019, of which nitrogen oxides ($NO_X$) were 6.356 million tons. Diesel vehicles are the main contributor to $NO_X$ emissions, accounting for more than 88.9% of the total vehicle emissions. The emission standards for diesel vehicles in China mainly follow the European emission regulations, and selective catalytic reduction (SCR) technology is the main way to purify $NO_X$ from diesel vehicles by catalyzing. An SCR system consists of a catalyst, a urea injection system, a urea storage tank, and a control system. The catalyst, as a key component, directly determines the efficiency of the SCR system. As China's motor vehicle emission standards are being continuously upgraded, $NO_X$ emission limits have been further reduced, and the emissions of $N_2O$ and $NH_3$ are clearly limited. In the China Stage VI standard, molecular sieve-based SCR catalysts are regarded as future development trends due to the shortcomings of vanadium-tungsten-titanium catalysts such as poor low-temperature performance, narrow temperature windows, high production of the byproduct $N_2O$, and vanadium volatilization in high temperature environments. Such catalysts are composed of molecular sieves as carriers to support active metals, and have the advantages of low toxicity, high activity, wide windows, high selectivity, and the like. Common molecular sieve carriers comprise LTA, CHA, BEA, and AFX framework types, etc., and common active ingredients include Cu, Fe, Ce, Mn, etc. Molecular sieve-based SCR catalysts, represented by molecular sieves having CHA framework type, exhibit excellent low-temperature activity, wide activity temperature windows, high nitrogen selectivity, and low toxicity in $NH_3$-SCR reactions due to their unique microporous structures and suitable surface acidity. The most widely used typical commercial SCR catalysts in the European/China Stage VI are Cu-CHA catalysts.

Currently, molecular sieves having CHA framework type have the problems of long synthesis cycle, high difficulty, high cost, having difficulty in disposing waste liquid, and the like. As a result, China VI SCR devices for after-treatment system are costly, which limits their large-scale market applications. According to the Patent CN110407231A, the use of a new template 5, 6, 7, 8-tetrahydronaphthalene-2-yl-trimethylammonium hydroxide and/or p-vinylphenyl-N, N, N-trimethylammonium hydroxide is disclosed to synthesize a molecular sieve having CHA framework type, which saves an ion exchange of alkali metal in the prior art, has simple synthesis steps and low production cost, and has no wastewater discharge measured by Chemical Oxygen Demand (COD) and no pollution to the environment. According to the Patent CN110523432A, Cu-CHA catalysts are disclosed with the advantages of high acid density, low copper content, a wide catalytic activity temperature window, low-temperature and high-temperature activities, and good catalytic activity after hydrothermal aging treatment. Similarly, according to the Patents CN109867294A, CN104128200A, CN110665538B, CN108083292A, and CN103818927B, copper-based catalysts containing molecular sieves having CHA framework type and preparation methods therefor are disclosed. However, the intellectual property rights of these catalysts have been monopolized by foreign enterprises, greatly limiting the large-scale applications in China.

SUMMARY OF PRESENT DISCLOSURE

In view of the above, the present disclosure aims to provide a synthesis method for directly preparing an H-type molecular sieve having CHA framework type and the use thereof, so as to realize the direct preparation of a SCR catalyst containing molecular sieves having CHA framework type, with the molecular sieves as a carrier and samarium as an active ingredient without an ammonium exchange process.

In order to achieve the above objective, the technical solution of the present disclosure is implemented as follows:

A structure-directing agent for synthesizing a molecular sieve having CHA framework type includes at least one of Compound A and Compound B, a chemical formula of Compound A is $(C_4H_8NO)_3PO$, a structural formula of Compound A is a chemical formula of Compound B is $(C_4H_8NO)_2PO(C_4H_{10}N)$, and a structural formula of Compound B is A synthesis method for directly preparing an H-type molecular sieve having CHA framework type uses the foregoing structure-directing agent and includes the following steps:

Step 1, mixing and stirring the structure-directing agent with deionized water at room temperature until the mixture is clear, adding an aluminum sol, and stirring violently for 0.5-2 h, such as 0.5 h, 0.7 h, 0.8 h, 1.0 h, 1.2 h, 1.5 h, 1.6 h, 1.8 h, and 2 h, to form a sol-gel;

Step 2, adding a silicon source and a seed crystal into the sol-gel, and performing a hydrothermal synthesis reaction in a hydrothermal synthesis reactor to obtain a reaction solution; and Step 3, filtering the reaction solution, cleaning a filter cake, and heating to obtain an H-type molecular sieve having CHA framework type.

The acid-base equilibrium of the raw materials are utilized to design a neutral synthesis system (pH), which avoids introducing caustic alkali, and can directly prepare the molecular sieve having CHA framework type through hydrothermal synthesis.

Further, the Step 2 specifically comprises:
adding the silicon source and the seed crystal into the sol-gel, stirring evenly, then transferring to a hydrothermal synthesis reactor, heating to 155° C.-180° C. in a closed environment, and reacting for 7-48 h to obtain the reaction solution, such as, reacting at 155° C. for 48 h, reacting at 160° C. for 40 h, reacting at 165° C. for 32 h, reacting at 170° C. for 24 h, reacting at 175° C. for 16 h, or reacting at 180° C. for 7 h.

Further, an active ingredient of the aluminum sol includes $Al_2O_3$, an active ingredient of the silicon source includes $SiO_2$, and a molar ratio of the $Al_2O_3$, the $SiO_2$, the structure-directing agent, and the deionized water is 1:(0.1-50):(0.1-20):(10-200), and it can be, for example, 1:0.1:0.1:10, 1:1:5:60, 1:5:2:70, 1:10:3:80, 1:15:4:90, 1:20:5:100, 1:30:10:120, 1:40:15:160, 1:50:20:200, and preferably 1:(1-20):(0.1-5):(60-100).

Further, the aluminum sol has a solid content of 5%-50% by weight, and the silicon source includes at least one of silica sol, fumed silica, white carbon black, and ethyl orthosilicate; the seed crystal includes a molecular sieve having CHA framework type with a silicon-aluminum ratio less than 25, which aims to provide crystal nuclei and promote the synthesis of a hydrogen-type molecular sieve having CHA framework type, with a grain size not more than 5 μm, and preferably not more than 500 nm; and preferably, the seed crystal includes at least one of an SSZ-13 molecular sieve and an SAPO-34 molecular sieve having CHA framework type.

Further, the Step 3 specifically comprises: performing solid-liquid separation on the reaction solution in a plate and frame filter press, washing the filter cake with clear water for at least 3 times, drying at 120° C. until the water content is less than 6 wt %, heating at a rate of 2° C./min to 350° C.-450° C. and keeping a constant temperature for 1-2 h, and then heating to 500° C.-550° C. and keeping a constant temperature for 3-6 h to obtain the H-type molecular sieve having CHA framework type.

A samarium-based catalyst containing molecular sieves having CHA framework type includes a carrier, an active ingredient, and a metal additive, where the carrier is a molecular sieve having CHA framework type, a metal element of the active ingredient is Sm, and metal elements of the metal additive include at least one of Mn, Ce, W, Mo, Sn, Y, La, Pr, Nd, Zr, Nb, Pt, Pd, and Ag; preferably, the element of the active ingredient is distributed on the D6R cage, CHA cage, and/or the surface of the molecular sieve having CHA framework type; and further preferably, the metal elements of the metal additive include at least one of Mn, Mo, Nd, Pt, and Pd. The samarium-based catalyst containing molecular sieves having CHA framework type in the present disclosure is a Sm-based molecular sieve catalyst having CHA framework type modified by a rare earth or transition metal element, which mainly aims to enhance the low-temperature activity, broaden the temperature window, improve the nitrogen selectivity, and suppress the high-temperature hydrothermal degradation of the foregoing catalyst.

Further, the carrier includes at least one of SSZ-13, SAPO-34, SAPO-44, and ZK-4, and preferably SSZ-13 and SAPO-34; and/or a molecular sieve with more than two crystal structures containing CHA framework type (chabazite), specifically including at least one of eight-membered ring, ten-membered ring, and twelve-membered ring molecular sieves, preferably an eight-membered ring molecular sieve.

Further, a mass ratio of the Sm to the molecular sieve having CHA framework type is 0.5-15 wt %, and a molar ratio of the Sm to the metal additive is 1:(0.01-10); preferably, the mass ratio of the Sm to the molecular sieve having CHA framework type is 2.5-7.5 wt %, and the molar ratio of the Sm to the metal additive is 1:(0.5-5); further preferably, the samarium-based catalyst containing molecular sieves having CHA framework type is synthesized through at least one of ion exchange, impregnation, sol-gel, in-situ synthesis, molten salt synthesis, one-pot, and mixing and grinding; and further preferably, the samarium-based catalyst containing molecular sieves having CHA framework type is synthesized through at least one of ion exchange, impregnation, and in-situ synthesis.

Use of the foregoing samarium-based catalyst containing molecular sieves having CHA framework type in catalytic reduction of nitrogen oxides in exhaust emissions.

Compared with the prior art, the synthesis method for directly preparing an H-type molecular sieve having CHA framework type and the use thereof in the present disclosure have the following advantages:

(1) The structure-directing agent described in the present disclosure has molecular topologies, which is conducive to quickly and efficiently building a CHA framework, so that the prepared product has a regular morphology and high relative crystallinity;

(2) An H-type molecular sieve having CHA framework type with a relative crystallinity greater than 95% can be directly synthesized through the synthesis method described in the present disclosure. The molecular sieve product can be obtained by direct drying and calcination without an ammonium exchange process, so the synthesis method is simple, easy to perform, and suitable for large-scale production; and (3) The samarium-based catalyst containing molecular sieves having CHA framework type described in the present disclosure shows excellent ammonia adsorption capacity, low-temperature activity ($T_{50}=180°$ C.), active temperature window ($T_{90}=220°$ C.-575° C.), $N_2$ selectivity, and structural stability in the $NH_3$-SCR technology by virtue of the intrinsic activity of the Sm and the physical and chemical properties of the molecular sieve having CHA framework type. Under the action of the catalyst, nitrogen oxides react with reducing agents and are converted into harmless nitrogen and water.

BRIEF DESCRIPTION OF THE DRAWINGS

The accompanying drawings constituting a part of the present disclosure are used to provide further understanding of the present disclosure, and the illustrative examples of the present disclosure and the descriptions thereof are used to interpret the present disclosure, rather than constituting improper limitations to the present disclosure. In the figures.

DESCRIPTION OF THE EMBODIMENTS

Unless otherwise defined, the technical terms used in the following examples have the same meanings as those commonly understood by a person skilled in the art to which the present disclosure belongs. Test reagents used in the following examples are all conventional biochemical reagents, unless otherwise specified; and the experimental methods are conventional ones, unless otherwise specified.

In the present disclosure, a simulated flue gas used for $NH_3$-SCR performance test includes 500 ppm NO, 500 ppm $NH_3$, and 10% $O_2$, and $N_2$ is a balance gas, with a total flow rate of 1,000 ml/min and a reaction space velocity of 30,000 $h^{-1}$.

In the present disclosure, the low-temperature performance index $T_{50}$ represents a corresponding temperature when the $NO_X$ conversion rate reaches 50%; and the temperature window index $T_{90}$ represents a corresponding temperature range when the $NO_X$ conversion rate exceeds 90%.

Unless otherwise specified, all numerical values appearing in the specification and claims of the present disclosure, such as temperature, time, and material contribution percentage by mass, should not be understood as absolute accurate values, but are within the error ranges understood by those of ordinary skill in the art and allowed by the common knowledge.

The present disclosure will be explained in detail below in conjunction with examples and the accompanying drawings.

In the examples of the present disclosure, a structural formula of OSDA1 is:

a chemical formula of OSDA1 is $(C_4H_8NO)_3PO$, a structural formula of OSDA2 is:

and a chemical formula of OSDA2 is $(C_4H_8NO)_2PO$ $(C_4H_{10}N)$.

Example 1

25 g of OSDA1 is dissolved in 190 ml of deionized water, the solution is stirred completely at room temperature, 10.9 g of aluminum sol with a solid content of 30% is slowly added dropwise, and then the solution is stirred violently for 1 h to form a milky white sol-gel. Subsequently, 60 g of 30% silica sol and 0.05 g of seed crystal to SSZ-13 molecular sieve are added, and the solution is transferred to a hydrothermal synthesis reactor after even stirring, and heated to 165° C., followed by crystallization reaction for 24 h.

After the reaction is completed, solid-liquid separation is performed by using a plate and frame filter press, and a filter cake is washed repeatedly with clear water for 3 times, and dried at 120° C. until the water content of the product is less than 6 wt % for calcination. The product is heated to 350° C. at a rate of 2° C./min, preserved at a constant temperature for 1 h, then heated to 550° C., and preserved at a constant temperature for 6 h to obtain a solid product of white powder.

Figure 1:
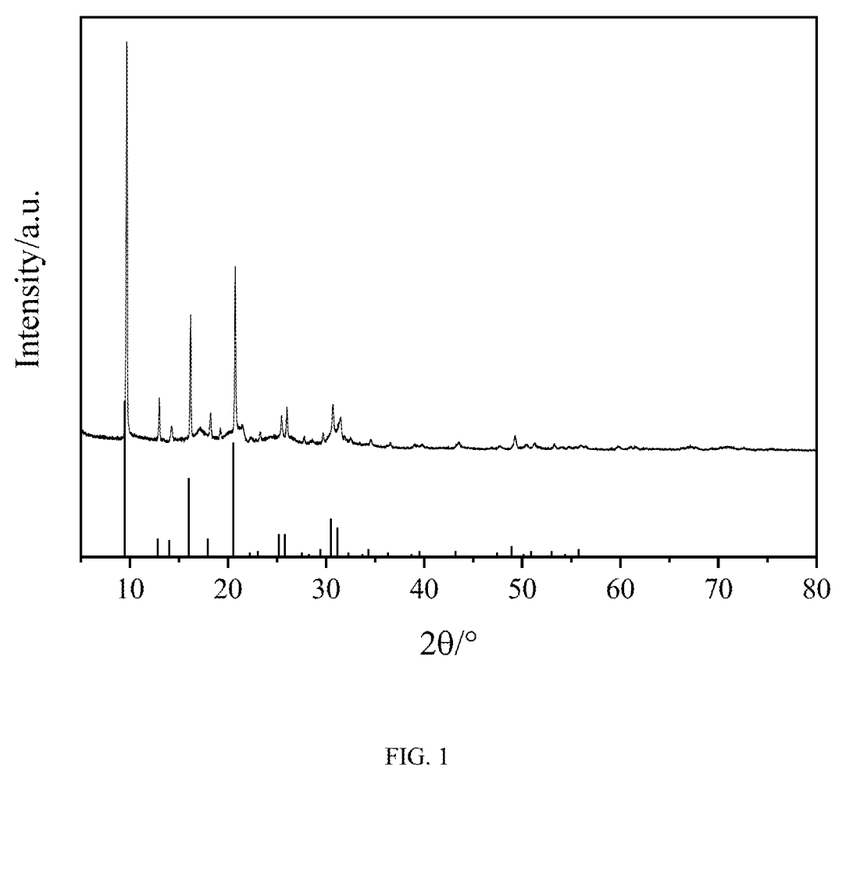
FIG. 1 is a schematic diagram showing a crystal structure of a molecular sieve product prepared in Example 1 of the present disclosure.
Figure 5:
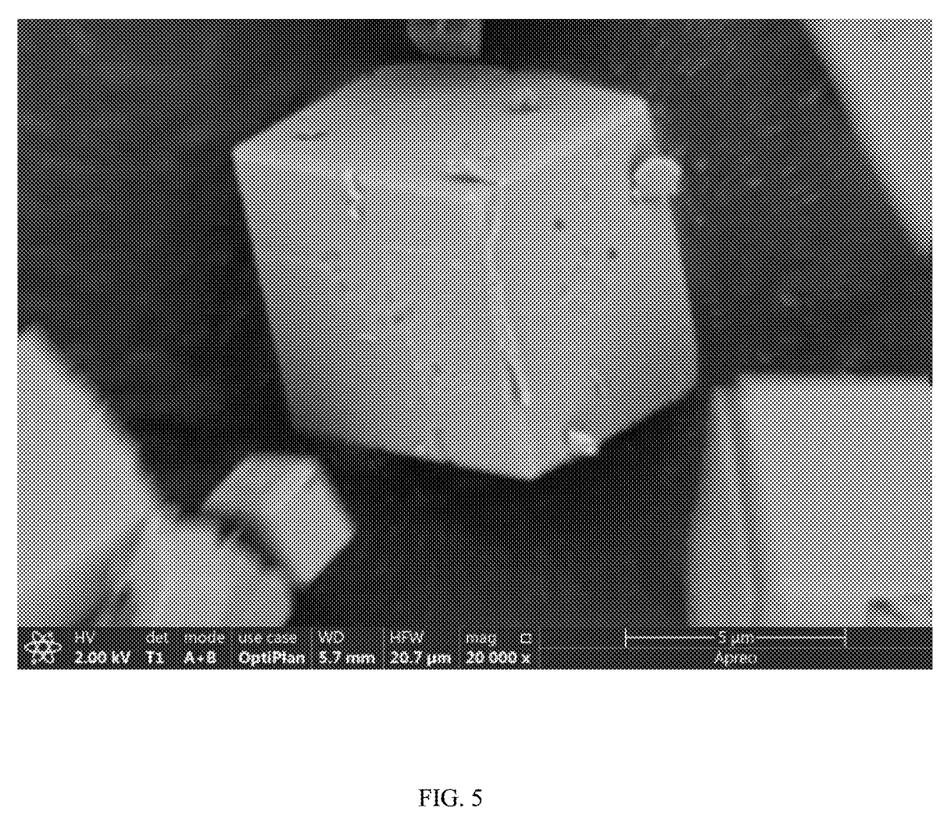
FIG. 5 is a schematic diagram showing a micro morphology of a molecular sieve product prepared in Example 1 of the present disclosure.

FIG. 1 shows characterization results about a crystal structure of the product, where X-Ray Diffraction (XRD) characterization results indicate that the foregoing solid product is a SAPO-34 molecular sieve having CHA framework type, with a relative crystallinity greater than 95%; X-ray Fluorescence (XRF) characterization indicates that the content of alkali metals (Na and K) in the product is less than 50 ppm; a micro morphology of the product is shown in FIG. 5, and particle size analysis results by laser diffraction indicate that the particle size is distributed at a range of 1-5 μm; and Scanning Electron Microscope (SEM) characterization indicates that the product is cubic block-shaped.

Example 2

The preparation conditions, addition of raw materials, and preparation process of the catalyst in this example are the same as those in Example 1, except that OSDA2 is used in this example instead of OSDA1.

Figure 2:
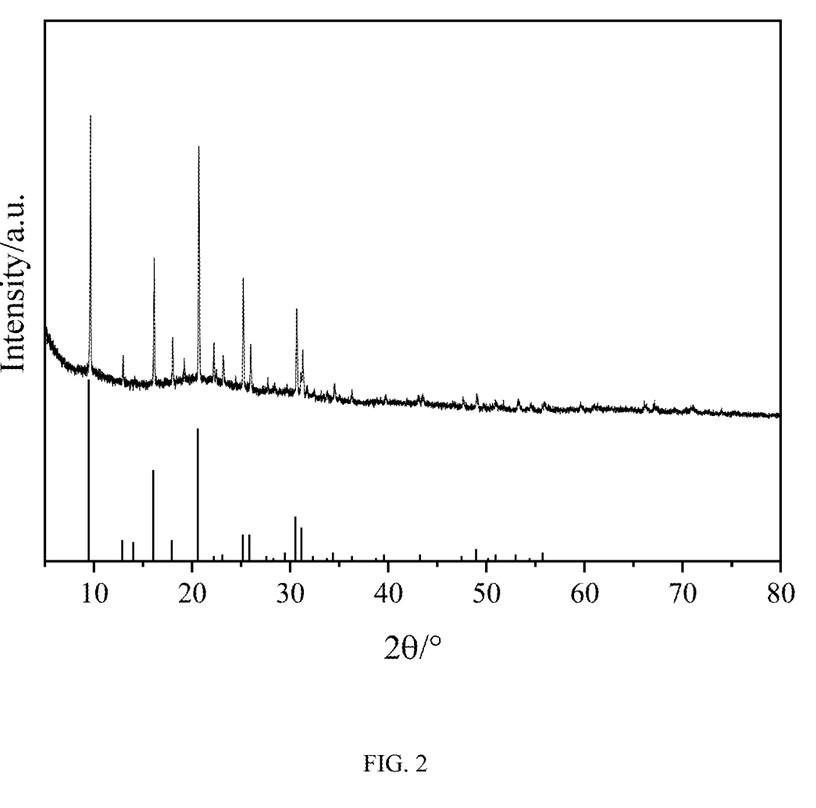
FIG. 2 is a schematic diagram showing a crystal structure of a molecular sieve product prepared in Example 2 of the present disclosure.
Figure 6:
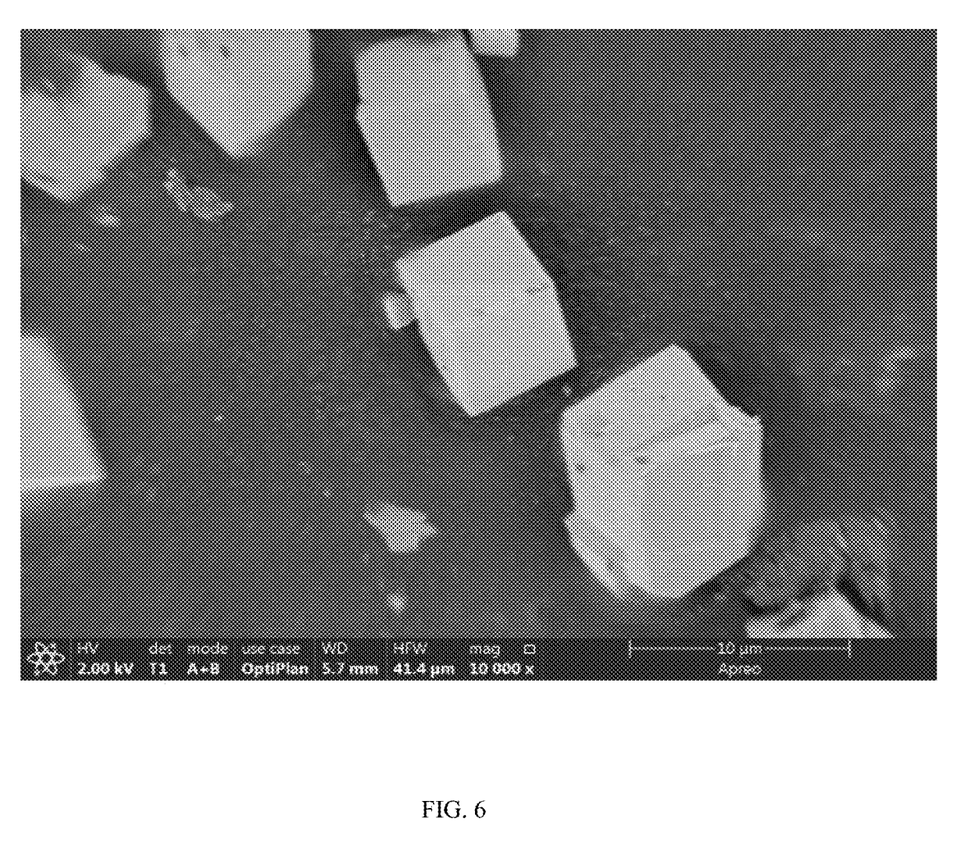
FIG. 6 is a schematic diagram showing a micro morphology of a molecular sieve product prepared in Example 2 of the present disclosure.

FIG. 2 shows characterization results about a crystal structure of the product. XRD characterization indicates that the obtained solid product is a SAPO-34 molecular sieve having CHA framework type, with a relative crystallinity greater than 95%; XRF characterization indicates that the content of alkali metals (Na and K) in the product is less than 50 ppm; a micro morphology of the product is shown in FIG. 6, and particle size analysis results by laser diffraction indicate that the particle size range is distributed at a range of 1-5 μm; and SEM characterization indicates that the product is cubic block-shaped.

Example 3

The preparation conditions and process of the catalyst in this example are the same as those in Example 1, except that a composite structure-directing agent with a ratio of OSDA1/OSDA2=1:1 is used in this example instead of OSDA1.

Figure 3:
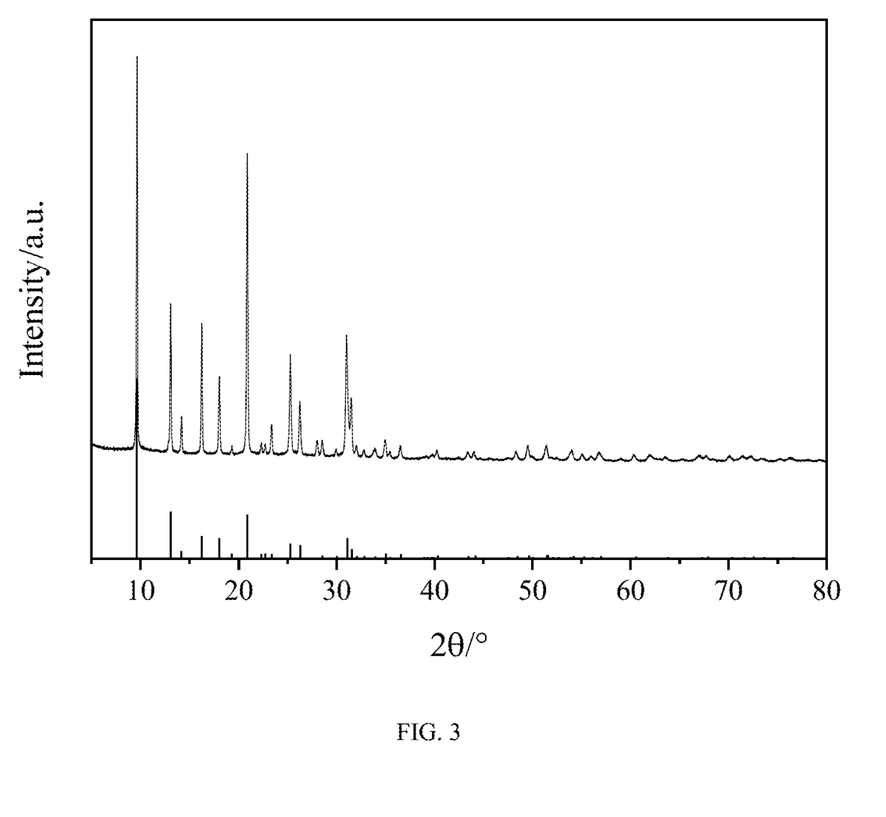
FIG. 3 is a schematic diagram showing a crystal structure of a molecular sieve product prepared in Example 3 of the present disclosure.
Figure 7:
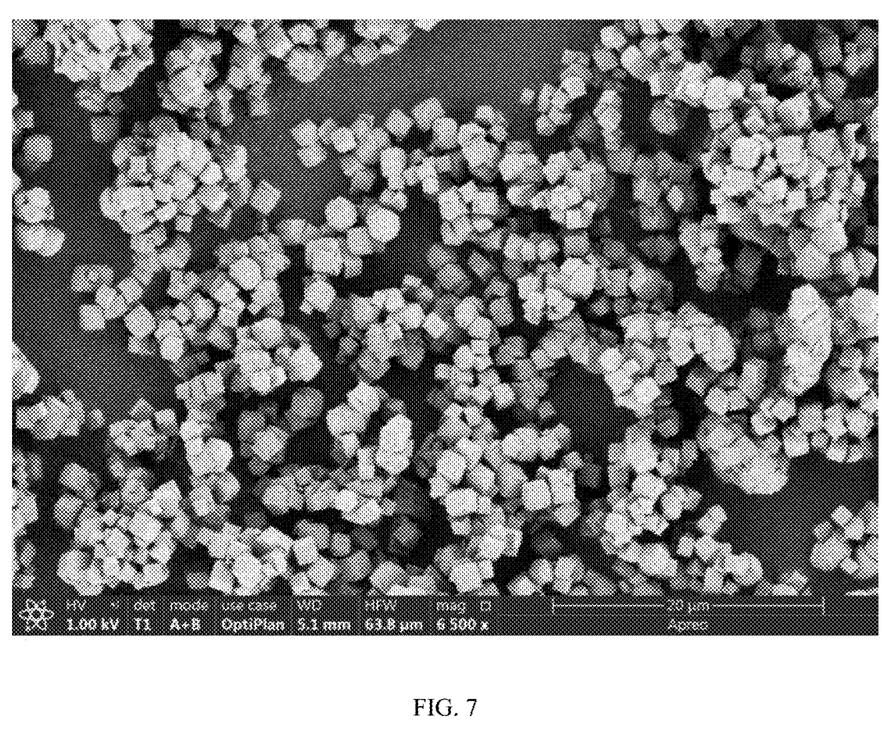
FIG. 7 is a schematic diagram showing a micro morphology of a molecular sieve product prepared in Example 3 of the present disclosure.
Figure 8:
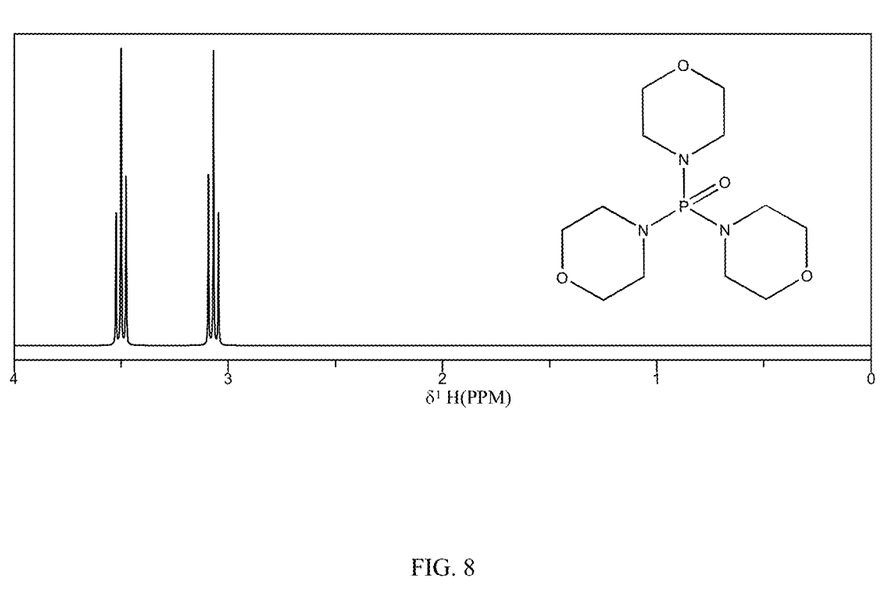
FIG. 8 is a schematic diagram showing $^1$H nuclear magnetic resonance (NMR) spectroscopy of an organic structure-directing agent (OSDA1) described in an example of the present disclosure.
Figure 9:
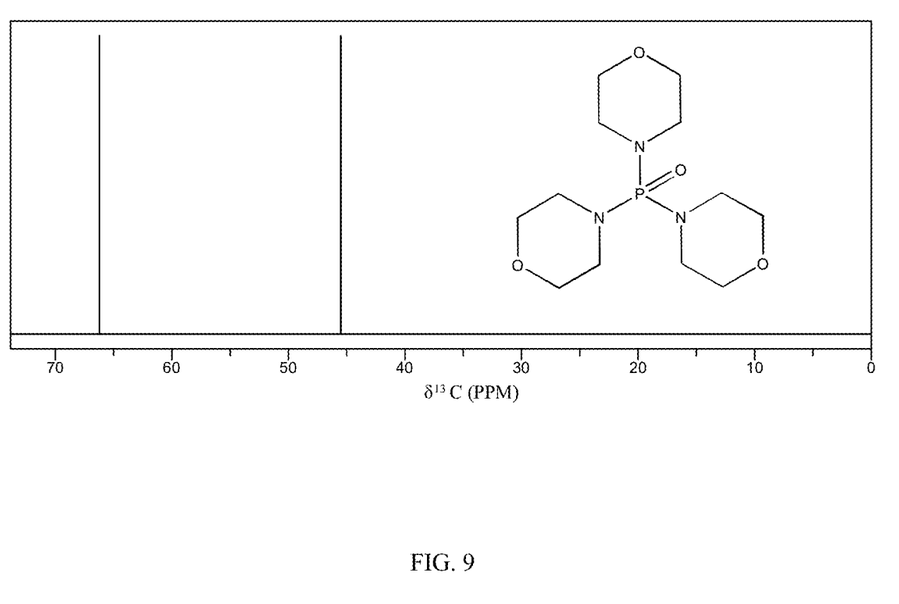
FIG. 9 is a schematic diagram showing $^{13}$H NMR spectroscopy of OSDA1 described in an example of the present disclosure.
Figure 10:
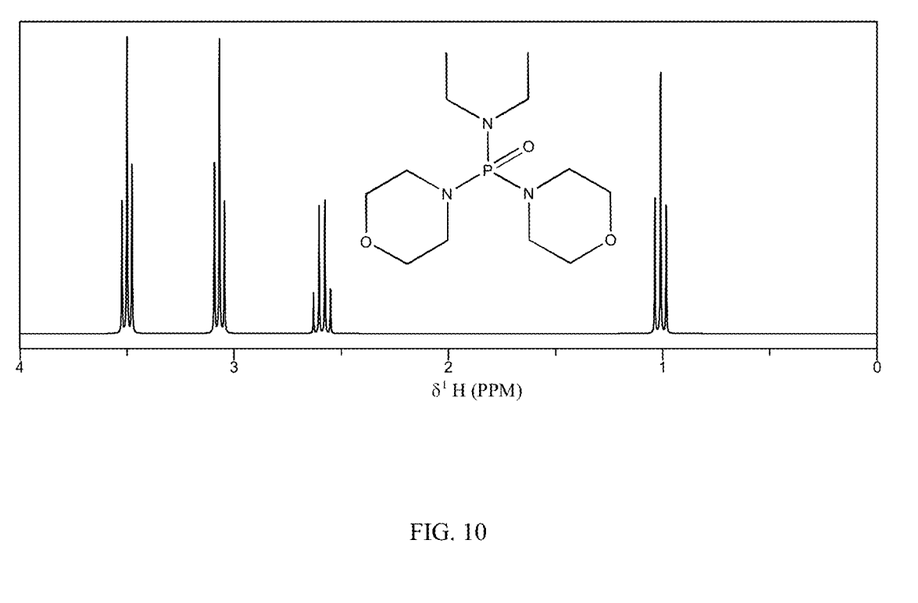
FIG. 10 is a schematic diagram showing $^1$H NMR spectroscopy of an organic structure-directing agent (OSDA2) described in an example of the present disclosure.
Figure 11:
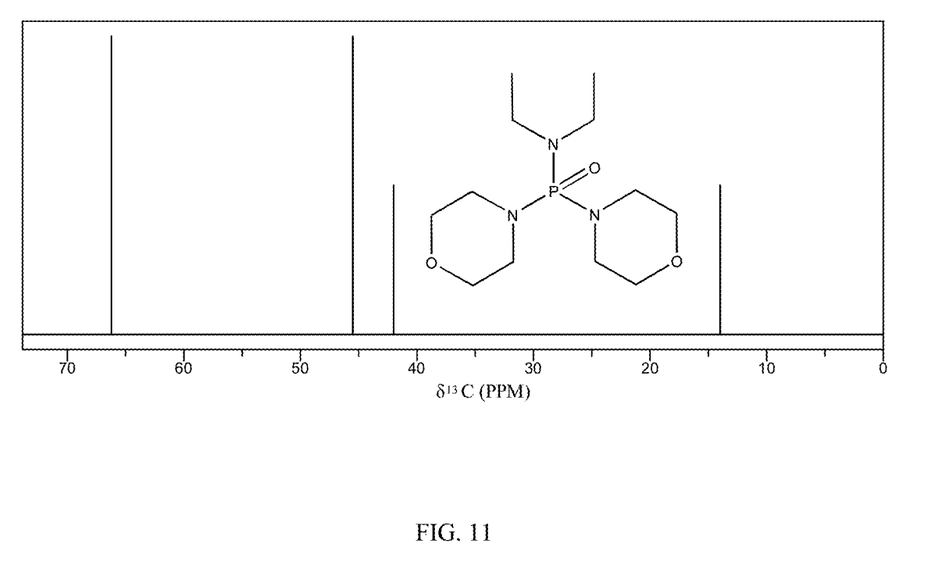
FIG. 11 is a schematic diagram showing $^{13}$H NMR spectroscopy of OSDA2 described in an example of the present disclosure.
Figure 12:
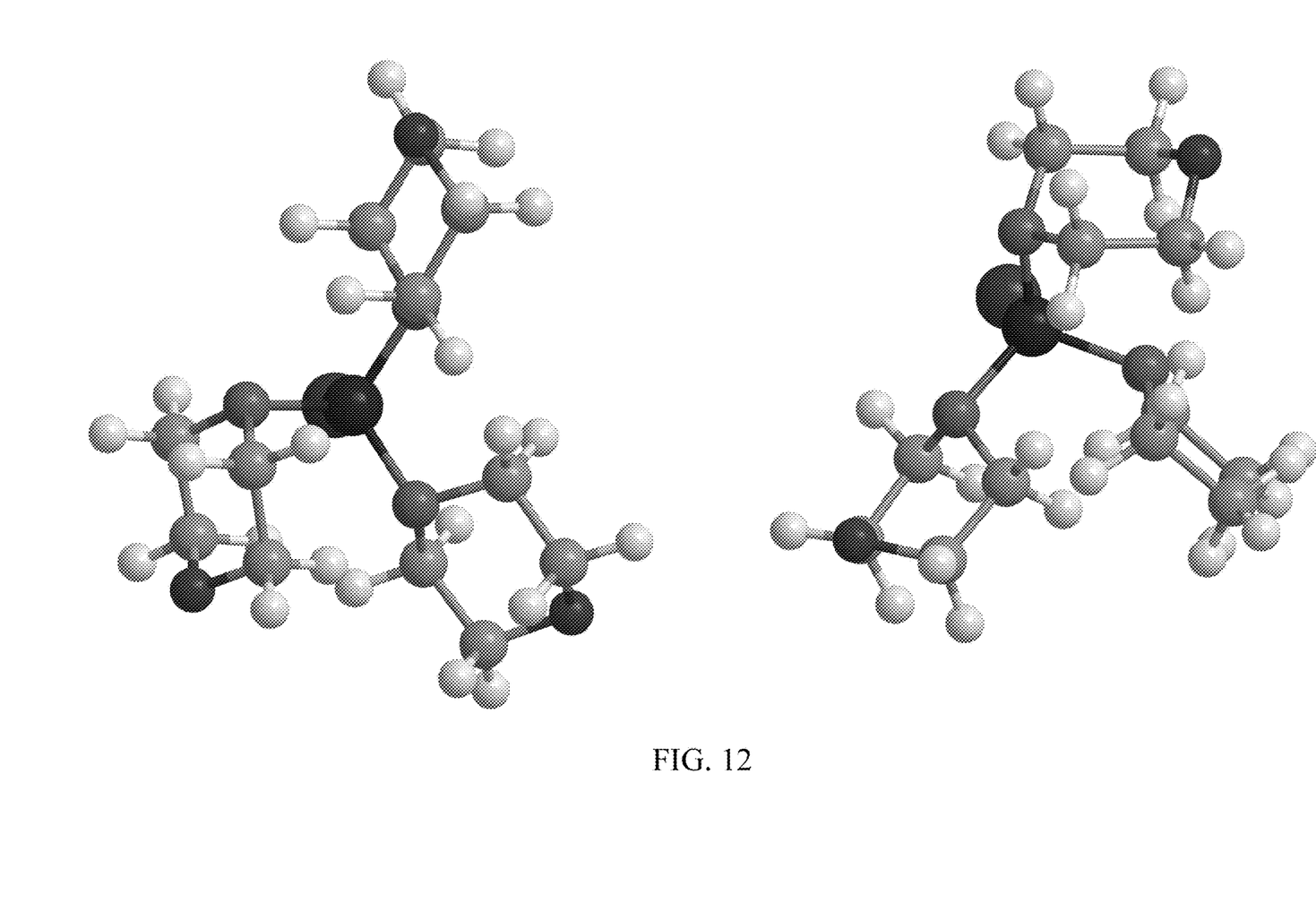
FIG. 12 is a schematic diagram of a three-dimensional molecular structure of a structure-directing agent described in an example of the present disclosure.

FIG. 3 shows characterization results about a crystal structure of the product. XRD characterization indicates that the obtained solid product is a mixed-crystal product of SAPO-34 and SSZ-13 molecular sieves having CHA framework type, with a relative crystallinity greater than 95%; XRF characterization indicates that the content of alkali metals (Na and K) in the product is less than 50 ppm, and a silicon-aluminum ratio ($SiO_2/Al_2O_3$) is 13.4; a micro morphology of the product is shown in FIG. 7, and particle size analysis results by laser diffraction indicate that the particle size range is distributed at a range of 1-5 μm; and SEM characterization indicates that the product is cubic block-shaped.

Example 4

The preparation conditions and process of the catalyst in this example are the same as those in Example 3, except that equimolar amount of ethyl orthosilicate is used in this example instead of silica sol.

XRD characterization indicates that the obtained solid product is a mixed-crystal product of SAPO-34 and SSZ-13 molecular sieves having CHA framework type, with a relative crystallinity greater than 95%; XRF characterization indicates that the content of alkali metals (Na and K) in the product is less than 50 ppm, and a silicon-aluminum ratio ($SiO_2/Al_2O_3$) is 13.4; particle size analysis results by laser diffraction indicate that the particle size range is distributed at a range of 1-5 μm; and SEM characterization indicates that the product is cubic block-shaped.

Comparative Example 1

N, N, N-trimethyl-1-adamantane ammonium hydroxide is currently the mainstream template for the industrial synthesis of Na-type SSZ-13 molecular sieves having CHA framework type.

The preparation conditions, addition of raw materials, and preparation process in this comparative example are the same as those in Example 1, except that N, N, N-trimethyl-1-adamantane ammonium hydroxide is used instead of OSDA1.

XRD characterization indicates that the obtained solid product is amorphous and has no characteristic diffraction peaks of molecular sieve having CHA framework types.

Comparative Example 2

Cu-TEPA (tetraethylenepentamine copper) is currently the mainstream template for preparing copper-based SSZ-13 molecular sieve catalysts containing molecular sieves having CHA framework type by a one-step method.

The preparation conditions, addition of raw materials, and preparation process in this comparative example are the same as those in Example 1, except that equimolar amount of Cu-TEPA is used instead of OSDA1.

XRD characterization indicates that the obtained solid product has no characteristic diffraction peaks of molecular sieve having CHA framework type.

Example 5

An ion exchange method is used in this example, and the molecular sieve carrier is the molecular sieve product prepared in Example 3, specifically comprising: 1 mol/L of samarium nitrate solution is prepared, 200 g of the solution is added into a 500 ml beaker, 10 g of the molecular sieve is added, and the solution is stirred and dispersed evenly; the solution is heated to 80° C. under a closed condition and stirred at a constant temperature to react for 6 h; after the above operation, the solution is filtered and a filter cake is repeatedly washed for 3 times to obtain solid powder; and the solid powder is dried at 120° C. for 6 h and calcined at a constant temperature of 550° C. for 5 h to obtain a samarium-based catalyst containing molecular sieves having CHA framework type.

Example 6

A mixing and grinding method is used in this example, and the molecular sieve carrier is the molecular sieve product prepared in Example 3, specifically comprising:

0.8 g of samarium nitrate is dissolved in 20 g of deionized water, 10 g of the molecular sieve is added, and the solution is stirred and dispersed evenly; the solution is transferred to a planetary ball mill and ground continuously for 4 h, the particle size distribution is controlled at a range of 0.5-1 and evaporation to dryness is performed to obtain solid powder; and the solid powder is dried at 120° C. for 6 h and calcined at a constant temperature of 550° C. for 5 h to obtain a samarium-based catalyst containing molecular sieves having CHA framework type.

Example 7

An impregnation method is used in this example, and the molecular sieve carrier is the molecular sieve product prepared in Example 3, specifically comprising: 0.8 g of samarium nitrate is dissolved in 20 g of deionized water, 10 g of the molecular sieve is added, and the solution is stirred and dispersed evenly; the solution is heated to 80° C. under a closed condition and stirred at a constant temperature to react for 6 h; after the above operation, stirring and evaporation to dryness are performed under reduced pressure to obtain solid powder; and the solid powder is dried at 120° C. for 6 h and calcined at a constant temperature of 550° C. for 5 h to obtain a samarium-based catalyst containing molecular sieves having CHA framework type.

Example 8

An in-situ synthesis method is used in this example, and the molecular sieve carrier is the molecular sieve product prepared in Example 3, specifically comprising: 15 g of OSDA1 and 10 g of OSDA2 are dissolved in 190 ml of deionized water, the solution is stirred completely at room temperature, 10.9 g of aluminum sol with a solid content of 30% is slowly added dropwise, and then the solution is stirred violently for 1 h to form a milky white sol-gel. Subsequently, 60 g of 30% silica sol and 0.05 g of seed crystal to SSZ-13 molecular sieve are added, the solution is stirred evenly, 1.6 g of samarium nitrate and 5 g of ammonia are added, and the solution is transferred to a hydrothermal synthesis reactor after even stirring, and heated to 165° C., followed by crystallization reaction for 24 h.

After the reaction is completed, solid-liquid separation is performed by using a plate and frame filter press, and a filter cake is washed repeatedly with clear water for 3 times, and dried at 120° C. until the water content of the product is less than 6 wt % for calcination. The product is heated to 350° C. at a rate of 2° C./min, preserved at a constant temperature for 1 h, then heated to 550° C., and preserved at a constant temperature for 6 h to obtain a samarium-based catalyst containing molecular sieves having CHA framework type.

Example 9

In this example, Mn and Fe are introduced for modification on the basis of the catalyst prepared in Example 5, specifically comprising: 20 g of the catalyst product in Example 5 is stirred and dispersed evenly in 150 g of deionized water solution, 5 g of manganese nitrate solution (50 wt %) and 2 g of iron nitrate solution are added, the solution is heated to 80° C. under a closed condition and stirred at a constant temperature to react for 6 h; and after the above operation, stirring and evaporation to dryness are performed under reduced pressure to obtain earthy-yellow solid powder.

The earthy-yellow solid powder is dried at 120° C. for 6 h and calcined at a constant temperature of 550° C. for 5 h to obtain a modified samarium-based catalyst containing molecular sieves having CHA framework type.

Example 10

Figure 4:
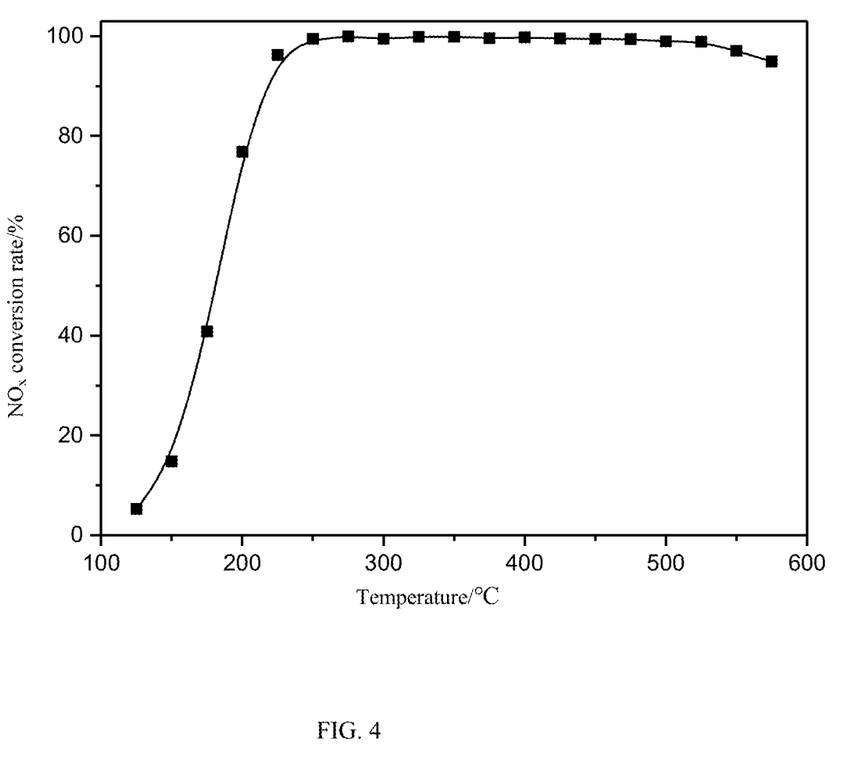
FIG. 4 is a schematic diagram showing a $NO_X$ conversion rate curve of a samarium-based catalyst containing molecular sieves having CHA framework type.

The modified samarium-based catalyst containing molecular sieves having CHA framework type prepared in Example 9 is prepared into a 40-60 mesh powder sample, and $NH_3$-SCR catalytic performance is evaluated on a micro fixed bed reactor. A quartz reaction tube with a size of 15 mm is used, and a heating rate of 5° C./min is applied in the evaluation test. A simulated gas includes 500 ppm NO, 500 ppm $NH_3$, and 10% $O_2$, and $N_2$ is a balance gas, with a total flow rate of 1,000 ml/min and a reaction space velocity is 30,00010. Test results are shown in FIG. 4.

The test results show that the foregoing catalyst has a $NO_X$ ignition temperature $T_{50}$ of 180° C. and an active temperature window $T_{90}$ of 220° C.-575° C.

The above descriptions are only preferred examples of the present disclosure, and are not intended to limit the present disclosure. Any modification, equivalent replacements improvements and the like made within the spirit and principle of the present disclosure is included in the protection scope of the present disclosure.

What is claimed is:

1. A synthesis method for directly preparing a molecular sieve having the CHA framework using a structure-directing agent, comprising the following steps:
    Step 1, mixing and stirring the structure-directing agent with water until the mixture is clear, adding an aluminum sol, and stirring to form a sol-gel, wherein an active ingredient of the aluminum sol comprises $Al_2O_3$;
    Step 2, adding a silicon source and a seed crystal into the sol-gel, stirring evenly, then transferring to a hydrothermal synthesis reactor, heating to 155° C.-180° C. in a closed environment, and reacting for 7-48 h to obtain a reaction solution, wherein an active ingredient of the silicon source comprises $SiO_2$, and a molar ratio of the $Al_2O_3$, the $SiO_2$, the structure-directing agent, and the deionized water is 1:(0.1-50):(0.1-20):(10-200); and
    Step 3, filtering the reaction solution, cleaning a filter cake, and heating to obtain a molecular sieve having the CHA framework;
    wherein a chemical formula of the structure-directing agent is $(C_4H_8NO)_2PO(C_4H_{10}N)$, and
    a structural formula of the structure-directing agent is:

2. The synthesis method according to claim 1, wherein the aluminum sol has a solid content of 5%-50%; the silicon source comprises at least one of silica sol, fumed silica, white carbon black, and ethyl orthosilicate; and the seed crystal comprises a molecular sieve having CHA framework with a silicon-aluminum ratio less than 25.

3. The synthesis method according to claim 1, wherein the Step 3 specifically comprises:
    performing solid-liquid separation on the reaction solution in a plate and frame filter press, washing the filter cake with clear water for at least 3 times, drying at 120° C. until the water content is less than 6 wt %, heating at a rate of 2° C./min to 350° C.-450° C. and keeping a constant temperature for 1-2 h, and then heating to 500° C.-550° C. and keeping a constant temperature for 3-6 h to obtain the molecular sieve having the CHA framework.

* * * * *